United States Patent [19]

Orsini, Jr.

[11] Patent Number: 5,337,476
[45] Date of Patent: Aug. 16, 1994

[54] METHOD OF MAKING A CAMSHAFT

[75] Inventor: Louis V. Orsini, Jr., Kensington, Conn.

[73] Assignee: The Torrington Company, Torrington, Conn.

[21] Appl. No.: 180,247

[22] Filed: Jan. 12, 1994

Related U.S. Application Data

[63] Continuation-in-part of Ser. No. 912,432, Jul. 13, 1992, Pat. No. 5,280,675.

[51] Int. Cl.⁵ .................................... B23P 15/00
[52] U.S. Cl. .................................... 29/888.1; 29/523; 74/567
[58] Field of Search ............ 29/888.1, 888.08, 469.5, 29/507, 523; 74/567; 72/340

[56] References Cited

U.S. PATENT DOCUMENTS

| 1,945,092 | 1/1934 | Storer | 29/153 |
|---|---|---|---|
| 4,294,100 | 10/1981 | Olschewski et al. | 72/340 |
| 4,597,365 | 7/1986 | Madaffer | 29/888.1 |
| 4,612,695 | 9/1986 | Umeha et al. | 29/505 |
| 4,693,138 | 9/1987 | Hughes et al. | 74/567 |
| 4,781,076 | 11/1988 | Hartnett et al. | 74/567 |
| 4,809,562 | 3/1989 | Bendoraitas et al. | 74/567 |
| 4,847,963 | 7/1989 | Bendoraitas et al. | 29/523 |
| 4,858,295 | 8/1989 | Hartnett et al. | 29/156.4 R |
| 4,882,825 | 11/1989 | Nakamura | 29/888.1 |
| 4,903,543 | 2/1990 | Matt | 74/567 |
| 4,947,547 | 8/1990 | Matt | 29/888.1 |
| 5,007,165 | 4/1991 | Podhorsky | 29/888.1 |
| 5,052,845 | 10/1991 | Maus et al. | 29/888.1 |
| 5,101,554 | 4/1992 | Brever et al. | 29/888.1 |
| 5,136,780 | 8/1992 | Hishida | 29/888.1 |
| 5,157,832 | 10/1992 | Hughes | 29/888.1 |
| 5,197,351 | 3/1993 | Hishida | 29/888.1 |
| 5,205,187 | 4/1993 | Ebbinghaus | 29/888.1 |
| 5,259,268 | 11/1993 | Ebbinghaus et al. | 74/567 |

FOREIGN PATENT DOCUMENTS

| 0324499 | 7/1989 | European Pat. Off. | |
| 3521206A1 | 12/1986 | Fed. Rep. of Germany | |
| 3941718 | 6/1991 | Fed. Rep. of Germany | 29/888.1 |
| 0189830 | 8/1986 | Japan | 29/888.1 |
| 0267029 | 11/1987 | Japan | 29/888.1 |

Primary Examiner—Irene Cuda
Attorney, Agent, or Firm—Michael H. Minns

[57] ABSTRACT

A method of forming a camshaft tube having a plurality of thinner wall sections adjacent to thicker wall sections. The diameter of a hollow tube is mechanically reduced with a retractable mandrel inserted in the hollow tube. The retractable mandrel has a first portion having a larger diameter than an adjacent second portion. To form a thinner wall section, the larger diameter first portion is positioned under a reducing tool. To form a thicker portion, the smaller diameter second portion is positioned under a reducing tool.

7 Claims, 3 Drawing Sheets

METHOD OF MAKING A CAMSHAFT

This is a continuation-in-part of application Ser. No. 07/912,432, filed Jul. 13, 1992, now U.S. Pat. No. 5,280,675, issued Jan. 25, 1994.

BACKGROUND OF THE INVENTION

This invention relates generally to camshafts for reciprocating piston engines and more particularly to method of making a camshaft where the cams and shaft are produced as individual elements and are fastened together forming the camshaft.

One method of manufacturing camshafts involves forming the cams separately by methods such as powdered metallurgy. The cams are then fastened to a hollow tube using known fastening processes, such as welding, brazing or expansion of the hollow tube. Bearing or journal surfaces are machined onto the hollow tube between cams. Another method of attaching the cams, described in U.S. Pat. No. 4,858,295, leaves a plurality of projections on the outside of the hollow tube between cams. These projections must be removed in order to form the journal surfaces.

The displacement of material caused by an expander tool during expansion of the hollow tube induces work hardening and stress into the tube. Limiting work hardening reduces the risk of failure due to tube splitting.

The foregoing illustrates limitations known to exist in present camshafts. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method of forming a camshaft tube comprising the steps of: providing a hollow tube; providing a retractable mandrel, the retractable mandrel having a first portion and a second portion adjacent the first portion, the diameter of the first portion being larger than the diameter of the second portion; inserting the retractable mandrel into the hollow tube; mechanically reducing a first section of the hollow tube, the first portion of the retractable mandrel being positioned under the section of the hollow tube being reduced; positioning the second portion of the retractable mandrel under a second section of the hollow tube; and mechanically reducing the second section of the hollow tube, the second portion of the retractable mandrel being positioned under the section of the hollow tube being reduced.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
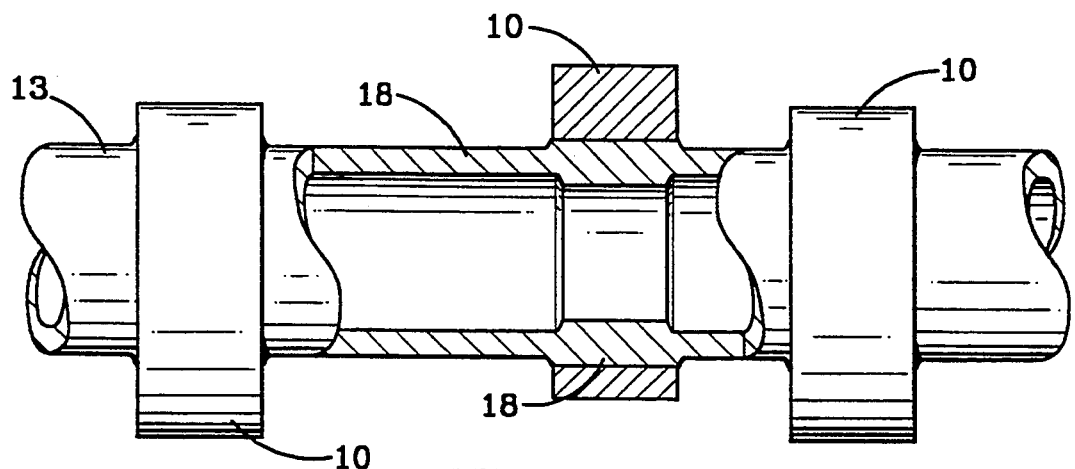
FIG. 1 is a cross section in part of a camshaft of the present invention.

Referring to the drawings and more particularly to FIG. 1, the manufacture of the camshaft is accomplished by slipping the cams 10 over a hollow tube 13. Other elements in addition to cams 10, may be attached to the hollow tube 13 using this method. This includes timing gears, thrust washers, bearing rings, etc. The hollow tube 13 has a plurality of areas 16 which have a thicker wall thickness than the adjacent areas 18. The cams 10 are positioned about the thicker wall areas 16. Some of the thinner wall areas 18 are used as bearing or journal surfaces.

The hollow tube 13 is preferably made of formable steel having a maximum hardness of $R_c30$. The cams 10 are preferably made of steel which is hardenable to a minimum hardness of $R_c55$. Powder forged AISI 4680 series material has also been successfully used as cams 10.

The preferred method for forming the hollow tube 13 with a plurality of thinner areas (or first sections) 18 and thicker areas (or second sections) 16 utilizes a swaging operation as illustrated in FIGS. 5A through 5D. A retractable mandrel 50 is inserted into a hollow tube 13. The retractable mandrel 50 has a first portion 54 and an adjacent second portion 52. The diameter of the first portion 54 is larger than the diameter of the second portion 52. As shown in the FIGS., the second portion 52 is an end portion on a free end of the retractable mandrel 50. The other end of the retractable mandrel 50 is attached to a machine (not shown).

Figure 5A:
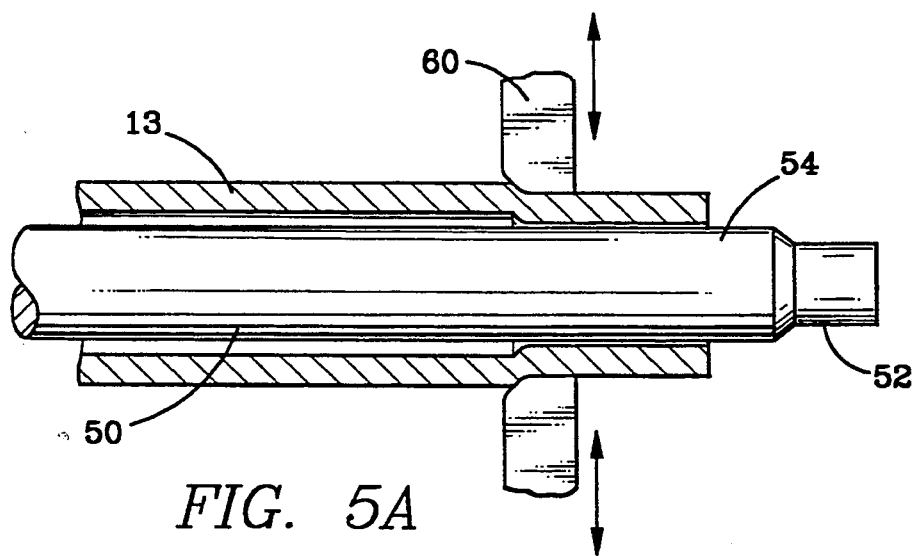
FIGS. 5A through 5D are cross-sections of a hollow tube illustrating the steps of forming the hollow tube shown in FIG. 2 using a retractable mandrel.
Figure 5B:
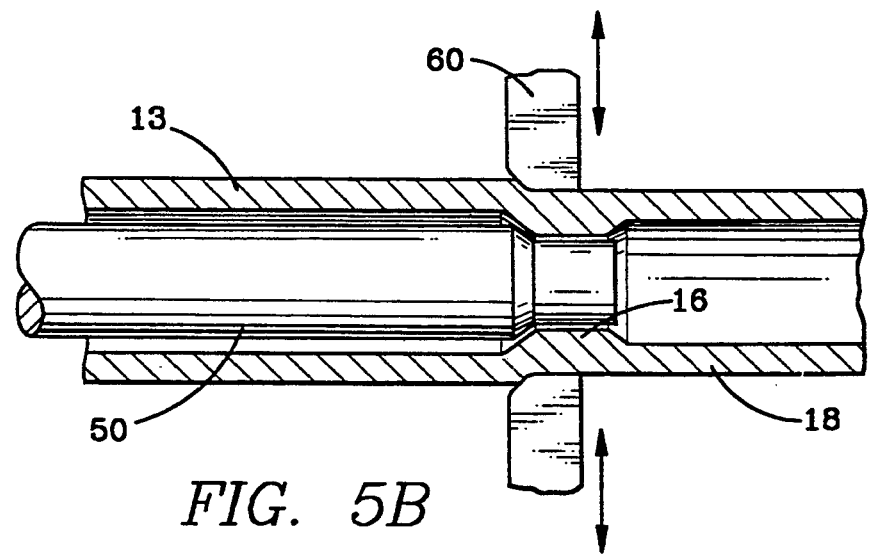
Figure 5C:
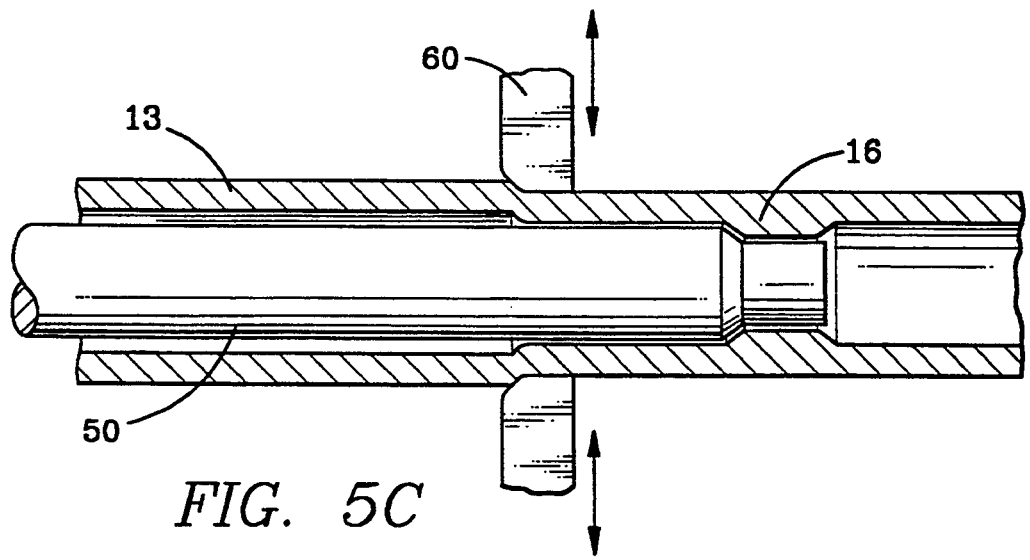
Figure 5D:
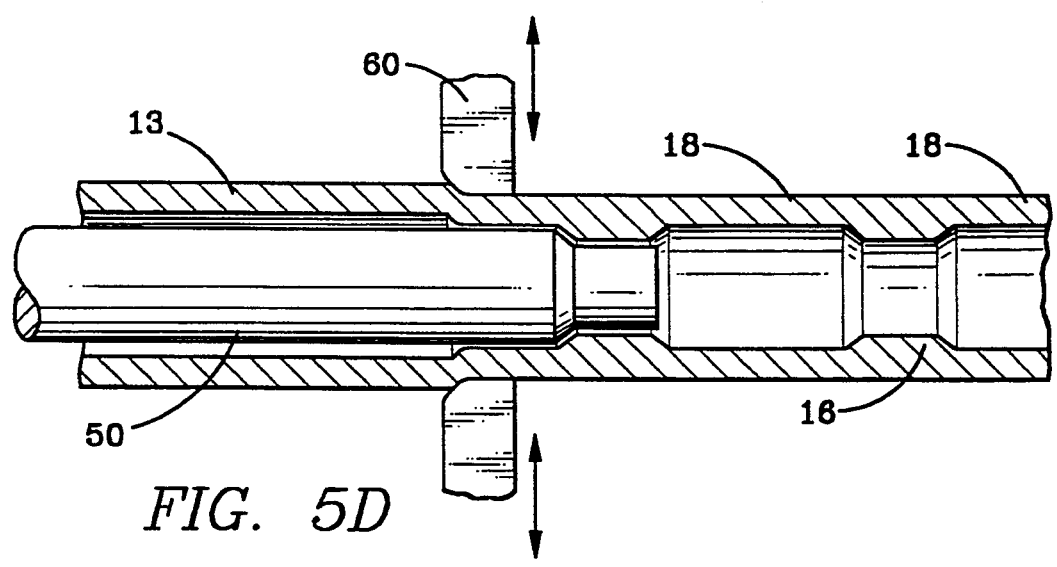

The retractable mandrel 50 is positioned within the hollow tube 13 with the larger diameter first portion 54 under a swaging tool or die 60, as shown in FIG. 5A. The hollow tube 13 and retractable mandrel 50 are then pushed through the swaging tool 60, from left to right in FIGS. 5A through 5D, reducing the outer diameter of the hollow tube 13 and forming a thinner area or first section 18 of the hollow tube 13. The retractable mandrel 50 is then retracted to the left to position the smaller diameter second portion 52 under swaging tool 60. The hollow tube is continued to be pushed through the swaging tool 60, reducing the outer diameter of the hollow tube 13 and forming a thicker area or second section 16 of the hollow tube 13, as shown in FIG. 5B. After the second section 16 is formed, the retractable mandrel 50 and the hollow tube 13 are both pushed through the swaging tool 60, as shown in FIG. 5C, forming another thinner area or first section 18. The retractable mandrel 50 is then retracted to the left to position the smaller diameter second portion 52 under the swaging tool 60 and the hollow tube 13 is continued to be pushed through the swaging tool 60, forming an additional thicker area or second section 16 of the hollow tube 13, as shown in FIG. 5D.

Figure 2:
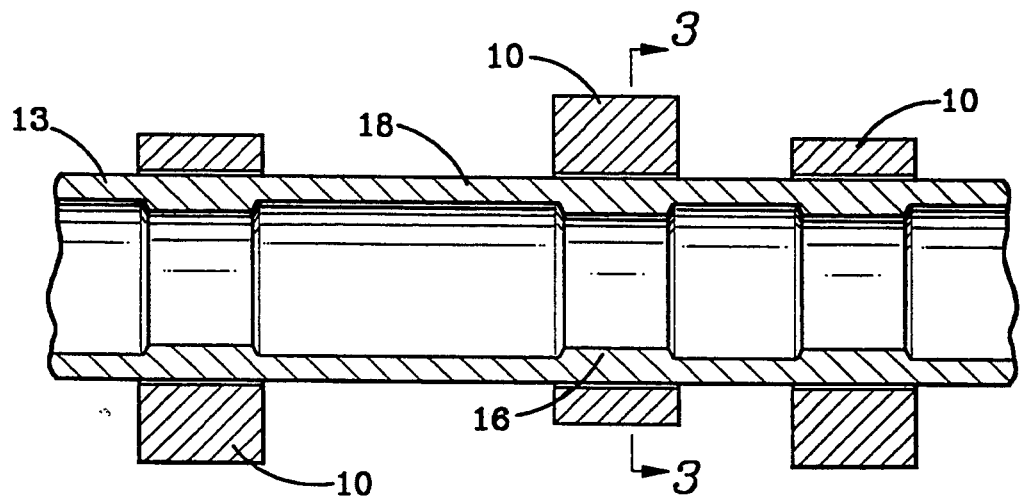
FIG. 2 is a cross section of the hollow tube shown in FIG. 1 after the hollow tube has been mechanically reduced, showing the cams located about the tube.

The steps of forming additional first sections 18 and second sections 16 are repeated until a complete tube 13 with multiple thinner areas 18 and multiple thicker areas 16, as shown in FIG. 2, is formed. Preferably, the swaging tool 60 reduces the outer diameter of the hollow tube 13 to the final diameter, such that no additional machining or reduction of the hollow tube 13 is required.

The diameter of the first and second portions 54, 52 of the retractable mandrel 50 determine the inner diameter of the first and second sections 18, 16 of the hollow tube 13. Since the outer diameter of the hollow tube 13 is kept constant, the first sections 18 of the hollow tube 13 are thinner than the second sections 16 of the hollow tube 13.

The preferred axial length for the thicker areas 16 is slightly less than the axial length of a cam 10. This should minimize or preclude any change in the outer diameter of the thinner areas 18 when the cams 10 are fastened to the hollow tube 13.

Figure 3:
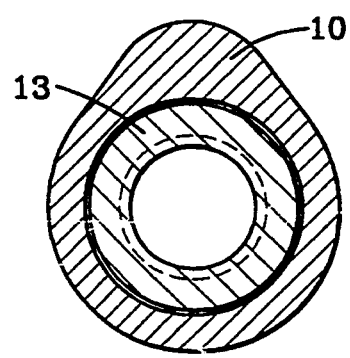
FIG. 3 is a cross section view taken along line 3—3 of FIG. 2.

The cams 10 are then assembled on the hollow tube 13 as shown in FIG. 2. Each cam 10 is aligned with a thicker wall area 16. The axial opening of the cam 10 is slightly larger than the outer diameter of the hollow tube, creating a slight gap between the cam 10 and the tube 13 as shown in FIGS. 2 and 3.

Figure 4:
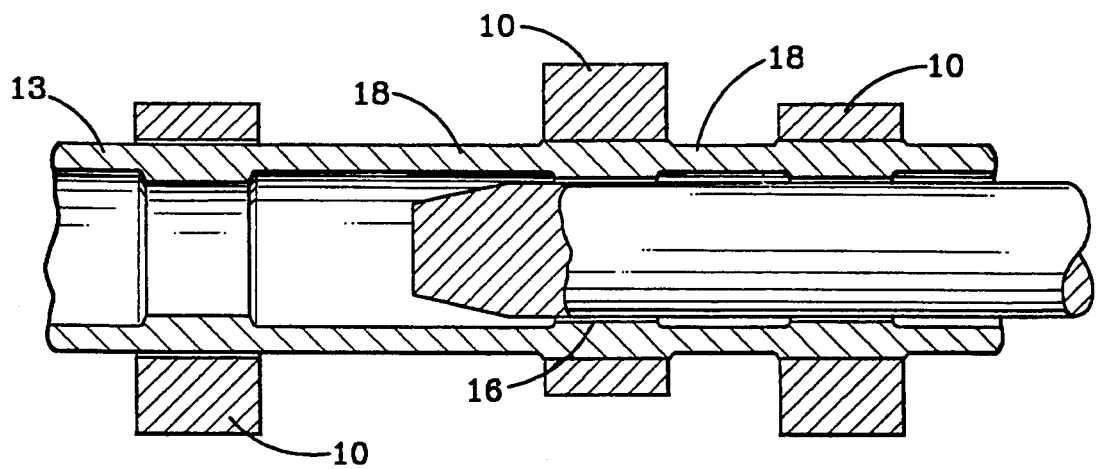
FIG. 4 is a cross section of the camshaft showing the cams after an expander tool has moved partially through the hollow tube.

The cams 10 are held in the proper angular alignment while an expander tool 36 is inserted into the hollow tube 13. FIG. 4 shows the expander tool 36 after it has been inserted past two cams 10. The outer diameter of the expander tool 36 is larger than the inner diameter of the thicker wall areas 16. The outer diameter is also smaller than the inner diameter of the thinner wall areas 18. As the expander tool 36 is inserted into the hollow tube 13, the thicker wall areas 16 are expanded outward into contact with the axial opening of the cam 10. This expansion locks the cams 10 and the hollow tube 13 into mechanical interference engagement, thereby providing axial retention of the cams 10. Since the outer diameter of the expander tool 36 is smaller than the inner diameter of the thinner wall areas 18, these areas are not expanded during the insertion of the expander tool 36. Therefor, these areas 18 typically do not require any additional post assembly machining.

Having described the invention, what is claimed is:

1. A method of forming a camshaft tube comprising the steps of:
    providing a hollow tube;
    providing a retractable mandrel, the retractable mandrel having a first portion and a second portion adjacent the first portion, the diameter of the first portion being larger than the diameter of the second portion;
    inserting the retractable mandrel into the hollow tube;
    mechanically reducing a first section of the hollow tube, the first portion of the retractable mandrel being positioned under the section of the hollow tube being reduced;
    positioning the second portion of the retractable mandrel under a second section of the hollow tube; and
    mechanically reducing the second section of the hollow tube, the second portion of the retractable mandrel being positioned under the section of the hollow tube being reduced.

2. The method according to claim 1, further comprising:
    repeating the steps of mechanically reducing a first section of the hollow tube, the first portion of the retractable mandrel being positioned under the section of the hollow tube being reduced; positioning the second portion of the retractable mandrel under a second section of the hollow tube; and mechanically reducing the second section of the hollow tube, the second portion of the retractable mandrel being positioned under the section of the hollow tube being reduced, thereby forming a plurality of first sections and second sections, the inner diameter of a first section being larger than the inner diameter of a second section.

3. The method according to claim 1, further comprising:
    providing a swaging tool; and
    using the swaging tool to mechanically reduce the hollow tube.

4. A method of forming a camshaft tube comprising the steps of:
    providing a hollow tube;
    providing an axially extending retractable mandrel, the retractable mandrel having a first portion and a second portion adjacent the first portion, the diameter of the first portion being larger than the diameter of the second portion, the second portion being an end of the retractable mandrel;
    inserting the retractable mandrel into the hollow tube;
    positioning the retractable mandrel whereby the first portion of the retractable mandrel is positioned under a first section of the hollow tube;
    providing a swaging tool;
    mechanically reducing the first section of the hollow tube by pushing the hollow tube through the swaging tool, the retractable mandrel also being moved to keep the first portion of the retractable mandrel positioned under the section of the hollow tube being reduced;
    retracting the retractable mandrel to position the second portion of the retractable mandrel under a second section of the hollow tube;
    mechanically reducing the second section of the hollow tube;
    repeating the steps of positioning the retractable mandrel whereby the first portion of the retractable mandrel is positioned under a first section of the hollow tube; mechanically reducing the first section of the hollow tube by pushing the hollow tube through the swaging tool, the retractable mandrel also being moved to keep the first portion of the retractable mandrel positioned under the section of the hollow tube being reduced; retracting the retractable mandrel to position the second portion of the retractable mandrel under a second section of the hollow tube; and mechanically reducing the second section of the hollow tube by pushing the hollow tube through the swaging tool, thereby forming a plurality of first sections and second sections, the inner diameter of a first section being larger than the inner diameter of a second section.

5. A method of making a camshaft comprising the steps of:
    providing a hollow tube;
    providing a retractable mandrel, the retractable mandrel having a first portion and a second portion adjacent the first portion, the diameter of the first portion being larger than the diameter of the second portion;
    inserting the retractable mandrel into the hollow tube;
    mechanically reducing a first section of the hollow tube, the first portion of the retractable mandrel being positioned under the section of the hollow tube being reduced;

positioning the second portion of the retractable mandrel under a second section of the hollow tube;

mechanically reducing the second section of the hollow tube, the second portion of the retractable mandrel being positioned under the section of the hollow tube being reduced;

repeating the steps of mechanically reducing a first section of the hollow tube, the first portion of the retractable mandrel being positioned under the section of the hollow tube being reduced; positioning the second portion of the retractable mandrel under a second section of the hollow tube; and mechanically reducing the second section of the hollow tube, the second portion of the retractable mandrel being positioned under the section of the hollow tube being reduced, thereby forming a plurality of first sections and second sections, the inner diameter of a first section being larger than the inner diameter of a second section, the second sections forming reduced diameter zones;

providing a plurality of cam elements, each cam element including an axial opening;

inserting the hollow tube into the cam elements, each cam element being positioned about a reduced diameter zone;

expanding the reduced diameter zones of the hollow tube into mechanical interference engagement with the cam elements.

6. The method of claim 5 wherein the areas of the hollow tube adjacent the reduced diameter zones define larger diameter zones and the larger diameter zones do not expand during the step of expanding the reduced diameter zones.

7. The method of claim 5, further comprising:

providing an expander tool having a diameter larger than the inner diameter of the thicker wall zones and smaller than the inner diameter of the thinner wall zones; and using the expander tool to expanding the thicker wall zones of the hollow tube into mechanical interference engagement with the cam elements by inserting the expander tool into the hollow tube.

* * * * *